(12) United States Patent
Tiirola et al.

(10) Patent No.: US 12,414,134 B2
(45) Date of Patent: Sep. 9, 2025

(54) CONTROL CHANNEL DETECTION IN TERMINAL DEVICE

(71) Applicant: NOKIA TECHNOLOGIES OY, Espoo (FI)

(72) Inventors: Esa Tapani Tiirola, Oulu (FI); Kari Juhani Hooli, Oulu (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/959,458

(22) Filed: Nov. 25, 2024

(65) Prior Publication Data

US 2025/0089070 A1  Mar. 13, 2025

Related U.S. Application Data

(63) Continuation of application No. 18/552,510, filed as application No. PCT/FI2022/050110 on Feb. 21, 2022.

(30) Foreign Application Priority Data

Mar. 26, 2021  (FI) ...................................... 20215352

(51) Int. Cl.
| | |
|---|---|
| H04L 27/26 | (2006.01) |
| H04W 72/0446 | (2023.01) |
| H04W 72/232 | (2023.01) |

(52) U.S. Cl.
CPC ..... *H04W 72/232* (2023.01); *H04L 27/26025* (2021.01); *H04W 72/0446* (2013.01)

(58) Field of Classification Search
CPC ............ H04W 72/232; H04W 72/0446; H04L 5/0007; H04L 5/0078; H04L 27/26025;
(Continued)

(56) References Cited

U.S. PATENT DOCUMENTS

| | | |
|---|---|---|
| 10,448,389 B1 | 10/2019 | Seo et al. |
| 2015/0200741 A1 | 7/2015 | Liu et al. |

(Continued)

FOREIGN PATENT DOCUMENTS

| | | |
|---|---|---|
| CN | 110505707 A | 11/2019 |
| CN | 110620645 A | 12/2019 |

(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

(Continued)

*Primary Examiner* — Andrew Lee
(74) *Attorney, Agent, or Firm* — Brake Hughes Bellermann LLP

(57) ABSTRACT

An example method includes determining at least a first search space configuration and a second search space configuration; determining a first set of periodic search spans formed by a first subset of time-domain symbols of each search window in the first set of periodic search windows and further determining a second set of periodic search spans; forming a sequence of search spans from the first set of periodic search spans and the second set of periodic search spans and determining a virtual search window; determining a maximum number of downlink control information candidates; searching the received signal within the virtual search window for up to the maximum number of downlink control channel candidates and omitting the searching for remaining downlink control channel candidates and, upon detecting the downlink control channel, extracting downlink control information on the downlink control channel.

20 Claims, 6 Drawing Sheets

(58) Field of Classification Search
CPC .. H04L 5/0053; H04L 5/0094; H04L 27/2602
See application file for complete search history.

(56) References Cited

U.S. PATENT DOCUMENTS

| | | | |
|---|---|---|---|
| 2019/0342777 A1* | 11/2019 | Tiirola | H04L 5/0091 |
| 2019/0349911 A1 | 11/2019 | Seo et al. | |
| 2020/0053580 A1 | 2/2020 | Bagheri et al. | |
| 2020/0229231 A1* | 7/2020 | Oh | H04W 80/08 |
| 2020/0322929 A1 | 10/2020 | Bagheri et al. | |
| 2020/0351644 A1* | 11/2020 | Yang | H04W 72/0446 |
| 2021/0058189 A1 | 2/2021 | Xiao et al. | |
| 2021/0282001 A1* | 9/2021 | Saber | H04W 8/24 |
| 2022/0053479 A1* | 2/2022 | Kim | H04L 5/0082 |
| 2022/0109597 A1* | 4/2022 | Takeda | H04L 1/0038 |
| 2022/0110140 A1* | 4/2022 | Takeda | H04L 5/0094 |
| 2023/0232599 A1* | 7/2023 | Suzuki | H05K 7/20927 361/699 |
| 2023/0276455 A1* | 8/2023 | Bhamri | H04L 5/001 370/329 |
| 2024/0172250 A1 | 5/2024 | Tiirola et al. | |
| 2024/0276495 A1* | 8/2024 | El Hamss | H04L 5/0094 |

FOREIGN PATENT DOCUMENTS

| | | |
|---|---|---|
| EP | 4316107 A1 | 2/2024 |
| WO | 2021024184 A1 | 2/2021 |
| WO | 2022200679 A1 | 9/2022 |

OTHER PUBLICATIONS

"3rd Generation Partnership Project; Technical Specification Group Radio Access Network; NR; Physical layer procedures for control (Release 15)", 3GPP TS 38.213, V15.8.0, Dec. 2019, pp. 1-109.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Draft discussion [104-e-NR-52-71GHz-02] on PDCCH monitoring enhancements", 3GPP TSG RAN WG1#104-e, R1-21xxxx, Agenda: 8.2.2, Lenovo, Jan. 25-Feb. 5, 2021, 111 pages.

International Search Report and Written Opinion received for corresponding Patent Cooperation Treaty Application No. PCT/FI2022/050110, dated Jun. 8, 2022, 13 pages.

Office action received for corresponding Finnish Patent Application No. 20215352, dated Nov. 15, 2021, 8 pages.

Rico-Alvarino et al., "An overview of 3GPP enhancements on machine to machine communications", IEEE Communications Magazine, vol. 54, No. 6, Jun. 2016, pp. 14-21.

U.S. Appl. No. 18/552,510, filed Sep. 26, 2023, Pending.

Extended European Search Report for European Patent Application No. 22774397.8, mailed on Jan. 22, 2025, 7 pages.

Office Action for Canadian Patent Application No. 3,213,311, mailed on Nov. 22, 2024, 3 pages.

3GPP TSG RAN Meeting #91e, RP-210462; "Status Report to TSG"; Agenda item: 9.7.2, Electronic Meeting; Mar. 16-26, 2021; 14 pages.

3GPP TSG RAN WG1 #104-e, R1-2102086; "Summary of [104-e-NR-7.1CRs-02] on Ambiguity Issues for UE Features with Cross-Carrier Operation"; Source: Moderator (ZTE); Agenda Item: 7.1; e-Meeting; Jan. 25-Feb. 5, 2021; 9 pages.

Office Action for Indian Patent Application No. 202317058483, mailed on Mar. 21, 2025, 8 pages.

* cited by examiner

TIME SLOTS OF RADIO FRAME

FIRST SEARCH SPACE CONFIGURATION (X=4 SLOTS, Y=4 SYMBOLS)

SECOND SEARCH SPACE CONFIGURATION (X=6 SLOTS, Y=2 SYMBOLS)

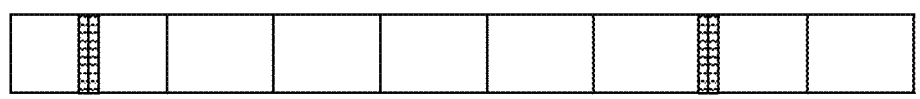

SEQUENTIAL SEARCH SPACE CONFIGURATION WITH ADAPTIVE VIRTUAL SEARCH WINDOW

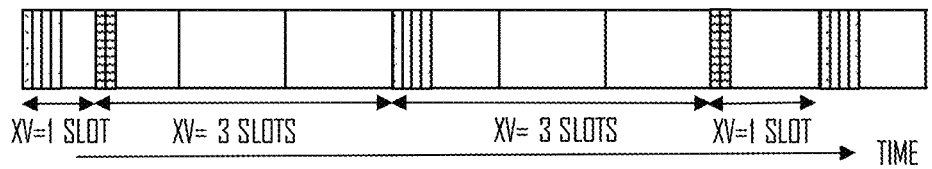

Fig. 3

TIME SLOTS OF RADIO FRAME

FIRST SEARCH SPACE CONFIGURATION (X=4 SLOTS, Y=4 SYMBOLS)

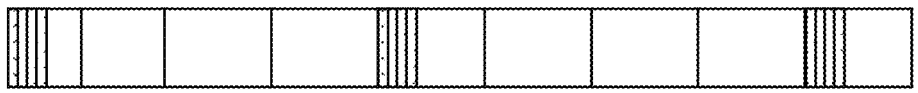

SECOND SEARCH SPACE CONFIGURATION (X=6 SLOTS, Y=2 SYMBOLS)

SEQUENTIAL SEARCH SPACE CONFIGURATION WITH ADAPTIVE VIRTUAL SEARCH WINDOW

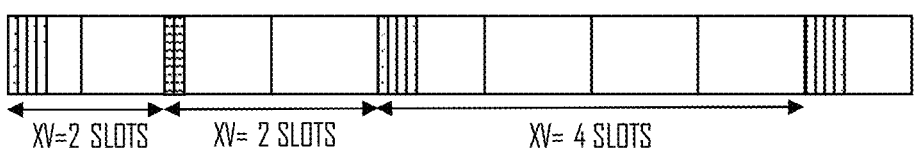

Fig. 4

SYMBOLS OF TIME SLOT AT SUB-CARRIER SPACING 1
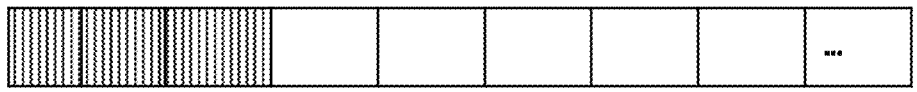
SYMBOLS OF TIME SLOT AT SUB-CARRIER SPACING 2
Fig. 5
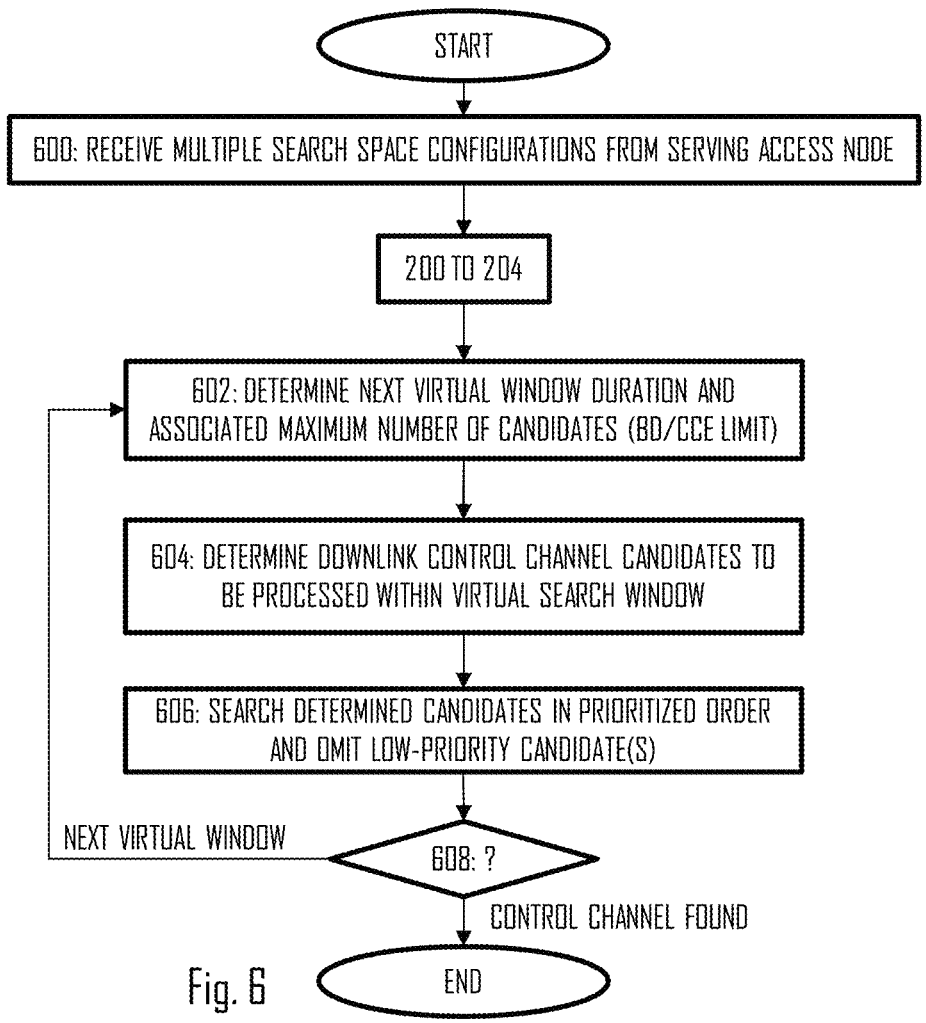
Fig. 6

CONTROL CHANNEL DETECTION IN TERMINAL DEVICE

RELATED APPLICATIONS

This is a continuation patent application of U.S. application Ser. No. 18/552,510, filed Sep. 26, 2023, entitled "CONTROL CHANNEL DETECTION IN TERMINAL DEVICE" which is a national stage entry of International Application No. PCT/FI2022/050110, filed Feb. 21, 2022, entitled "CONTROL CHANNEL DETECTION IN TERMINAL DEVICE" both of which are hereby incorporated by reference in their entireties.

FIELD

Various embodiments described herein relate to the field of wireless communications and, particularly, to detecting a downlink control channel.

BACKGROUND

In a cellular communication system, a terminal device (user equipment, UE) may be configured with one or multiple monitoring occasions within a time slot duration for monitoring a physical downlink control channel (PDCCH) in order to detect and extract downlink control information (DCI) addressed to the terminal device. The DCI carries, for example, scheduling information indicating uplink or downlink resources scheduled to the terminal device for data transmission or reception.

Some specifications for cellular communication systems specify a control resource set (CORESET) that is formed by a set of time-frequency resources in the form of a defined number of physical resource blocks (frequency resources) and a defined number of time-domain symbols, e.g. orthogonal frequency-division multiplexing (OFDM) symbols. A CORESET is a repeating time-frequency resource that may or may not carry the DCI on the PDCCH for the terminal device. Furthermore, the PDCCH may be formed by a varying number of control channel elements the terminal device needs to aggregate to detect the PDCCH. A search space (SS) defines an area within a CORESET that is defined as a group of said control channel elements. A search space defines also the periodic time instances when the corresponding CORESET is monitored. A serving access node (eNB or gNB) transmitting the DCI may configure a plurality of CORESETs and said search spaces to the terminal device. The terminal device then performs blind decoding throughout the search spaces. Each search space may be a function of time resources, frequency resources, and the aggregation levels, for example. A higher aggregation level has a greater coverage because of the higher number of control channel elements, allowing for more redundancy in the transmission.

As a consequence, the terminal device needs to scan through a high number of search spaces that are candidates for the PDCCH. The number may be so high that the terminal device does not have the capability of processing all the candidates and detecting the DCI addressed to it. This is relevant in particular for higher numerologies (higher sub-carrier spacings) where a duration of a time slot is shorter than on lower numerologies.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: determining at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows; determining a first set of periodic search spans formed by a first subset of time-domain symbols of each search window in the first set of periodic search windows and further determining a second set of periodic search spans formed by a second subset of time-domain symbols of each search window in the second set of periodic search windows; forming a sequence of search spans from the first set of periodic search spans and the second set of periodic search spans and determining a virtual search window changing in duration as dependent on a time interval between consecutive search spans in the sequence of search spans; determining, on the basis of a duration of the virtual search window, a maximum number of downlink control information candidates the apparatus is capable of processing within the virtual search window, wherein the maximum number of downlink control information candidates is configured to change together with the changing duration of the virtual search window; searching the received signal within the virtual search window for up to the maximum number of downlink control channel candidates and omitting the searching for remaining downlink control channel candidates and, upon detecting the downlink control channel, extracting downlink control information on the downlink control channel.

In an embodiment, the means are configured to determine the maximum number of downlink control information candidates the apparatus is capable of processing within the virtual search window further on the basis of a number of time-domain symbols within a search span.

In an embodiment, the search span is a current search span the apparatus is currently processing.

In an embodiment, the search span is the search span having the greatest number of time-domain symbols.

In an embodiment, the search span comprises a plurality of consecutive orthogonal frequency-division multiplexing symbols of a currently processed control resource set.

In an embodiment, the means are configured to receive the number of symbols in the search span from a higher protocol layer.

In an embodiment, the maximum number of downlink control information candidates the apparatus is capable of processing within the virtual search window is defined in terms of a maximum number of blind decoding attempts the apparatus is capable of performing within the virtual search window and the number of non-overlapping control channel elements the apparatus is capable of demodulating within the virtual search window.

In an embodiment, the maximum number of downlink control information candidates the apparatus is capable of processing within the virtual search window is different for consecutive virtual search windows having different lengths.

In an embodiment, the means are further configured to define a maximum number of downlink control information candidates the apparatus is capable of processing for each of a set of different durations of search windows, to determine that the apparatus has not defined a maximum number of downlink control information candidates the apparatus is capable of processing for at least one virtual search window and, in response to so determining, to select a maximum number of downlink control information candidates the apparatus is capable of processing that is associated with a search window having a duration smaller than the duration of the at least one virtual search window.

In an embodiment, the first search space configuration is based on a first sub-carrier spacing while the second search space configuration is based on a second sub-carrier spacing greater than the first sub-carrier spacing, wherein the first subset of time-domain symbols has a smaller number of time-domain symbols than the second subset of time-domain symbols.

In an embodiment, the means are configured to search all downlink control channel candidates of the first search space configuration and to omit the searching for downlink control channel candidates from at least some downlink control channel candidates of the second search space configuration.

In an embodiment, the means are configured to omit the searching for at least one control channel candidate that is outside the search spans.

According to another aspect, there is provided an apparatus comprising means for performing: determining at least a first search space configuration and a second search space configuration for a terminal device to search for a downlink control channel from a signal transmitted by the apparatus, wherein the first search space configuration defines first starting positions and first durations for a first set of periodic search windows and the second search space configuration defines second starting positions and second durations for a second set of periodic search windows different from the first set of periodic search windows; determining a first set of periodic search spans formed by a first subset of time-domain symbols of each search window in the first set of periodic search windows and further determining a second set of periodic search spans formed by a second subset of time-domain symbols of each search window in the second set of periodic search windows; forming a sequence of search spans from the first set of periodic search spans and the second set of periodic search spans and determining a virtual search window changing in duration as dependent on a time interval between consecutive search spans in the sequence of search spans; determining, on the basis of a duration of the virtual search window, a maximum number of downlink control information candidates the terminal device is capable of processing within the virtual search window, wherein the maximum number of downlink control information candidates is configured to change together with the changing duration of the virtual search window; allocating downlink control information addressed to the terminal device to control channel elements of the virtual search window that are within the maximum number of downlink control channel candidates and amongst downlink control channel candidates processed by the terminal device within the virtual search window; and transmitting a signal comprising the downlink control information on the control channel elements of the virtual search window.

In an embodiment, the means comprise at least one processor and at least one memory including computer program code, the at least one memory and computer program code configured to, with the at least one processor, cause the performance of the apparatus.

According to an aspect, there is provided a method comprising: determining, by a terminal device, at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows; determining, by the terminal device, a first set of periodic search spans formed by a first subset of time-domain symbols of each search window in the first set of periodic search windows and further determining a second set of periodic search spans formed by a second subset of time-domain symbols of each search window in the second set of periodic search windows; forming, by the terminal device, a sequence of search spans from the first set of periodic search spans and the second set of periodic search spans and determining a virtual search window changing in duration as dependent on a time interval between consecutive search spans in the sequence of search spans; determining, by the terminal device on the basis of a duration of the virtual search window, a maximum number of downlink control information candidates the terminal device is capable of processing within the virtual search window, wherein the maximum number of downlink control information candidates is configured to change together with the changing duration of the virtual search window; searching, by the terminal device, the received signal within the virtual search window for up to the maximum number of downlink control channel candidates and omitting the searching for remaining downlink control channel candidates and, upon detecting the downlink control channel, extracting downlink control information on the downlink control channel.

In an embodiment, the terminal device determines the maximum number of downlink control information candidates the terminal device is capable of processing within the virtual search window further on the basis of a number of time-domain symbols within a search span.

In an embodiment, the search span is a current search span the apparatus is currently processing.

In an embodiment, the search span is the search span having the greatest number of time-domain symbols.

In an embodiment, the search span comprises a plurality of consecutive orthogonal frequency-division multiplexing symbols of a currently processed control resource set.

In an embodiment, the terminal device configures the number of symbols in the search span for a physical layer from a higher protocol layer.

In an embodiment, the maximum number of downlink control information candidates the terminal device is capable of processing within the virtual search window is defined in terms of a maximum number of blind decoding attempts the apparatus is capable of performing within the virtual search window and the number of non-overlapping control channel elements the terminal device is capable of demodulating within the virtual search window.

In an embodiment, the maximum number of downlink control information candidates the terminal device is capable of processing within the virtual search window is different for consecutive virtual search windows having different lengths.

In an embodiment, the terminal device defines a maximum number of downlink control information candidates the terminal device is capable of processing for each of a set of different durations of search windows, to determine that the terminal device has not defined a maximum number of downlink control information candidates the terminal device is capable of processing for at least one virtual search window and, in response to so determining, to select a maximum number of downlink control information candidates the terminal device is capable of processing that is associated with a search window having a duration smaller than the duration of the at least one virtual search window.

In an embodiment, the first search space configuration is based on a first sub-carrier spacing while the second search space configuration is based on a second sub-carrier spacing greater than the first sub-carrier spacing, wherein the first subset of time-domain symbols has a smaller number of time-domain symbols than the second subset of time-domain symbols.

In an embodiment, the terminal device searches all downlink control channel candidates of the first search space configuration and omits the searching for downlink control channel candidates from at least some downlink control channel candidates of the second search space configuration.

In an embodiment, the terminal device omits the searching for at least one control channel candidate that is outside the search spans.

According to an aspect, there is provided a method comprising: determining, by an access node, at least a first search space configuration and a second search space configuration for a terminal device to search for a downlink control channel from a signal transmitted by the apparatus, wherein the first search space configuration defines first starting positions and first durations for a first set of periodic search windows and the second search space configuration defines second starting positions and second durations for a second set of periodic search windows different from the first set of periodic search windows; determining, by the access node, a first set of periodic search spans formed by a first subset of time-domain symbols of each search window in the first set of periodic search windows and further determining a second set of periodic search spans formed by a second subset of time-domain symbols of each search window in the second set of periodic search windows; forming, by the access node, a sequence of search spans from the first set of periodic search spans and the second set of periodic search spans and determining a virtual search window changing in duration as dependent on a time interval between consecutive search spans in the sequence of search spans; determining, by the access node on the basis of a duration of the virtual search window, a maximum number of downlink control information candidates the terminal device is capable of processing within the virtual search window, wherein the maximum number of downlink control information candidates is configured to change together with the changing duration of the virtual search window; allocating, by the access node, downlink control information addressed to the terminal device to control channel elements of the virtual search window that are within the maximum number of downlink control channel candidates and amongst downlink control channel candidates processed by the terminal device within the virtual search window; and transmitting, by the access node, a signal comprising the downlink control information on the control channel elements of the virtual search window.

According to an aspect, there is provided a computer program product embodied on a computer-readable medium and comprising a computer program code readable by a computer for a terminal device, wherein the computer program code configures the computer to carry out a computer process comprising: determining at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows; determining a first set of periodic search spans formed by a first subset of time-domain symbols of each search window in the first set of periodic search windows and further determining a second set of periodic search spans formed by a second subset of time-domain symbols of each search window in the second set of periodic search windows; forming a sequence of search spans from the first set of periodic search spans and the second set of periodic search spans and determining a virtual search window changing in duration as dependent on a time interval between consecutive search spans in the sequence of search spans; determining, on the basis of a duration of the virtual search window, a maximum number of downlink control information candidates the terminal device is capable of processing within the virtual search window, wherein the maximum number of downlink control information candidates is configured to change together with the changing duration of the virtual search window; searching the received signal within the virtual search window for up to the maximum number of downlink control channel candidates and omitting the searching for remaining downlink control channel candidates and, upon detecting the downlink control channel, extracting downlink control information on the downlink control channel.

According to an aspect, there is provided a computer program product embodied on a computer-readable medium and comprising a computer program code readable by a computer, wherein the computer program code configures the computer to carry out a computer process comprising: determining at least a first search space configuration and a second search space configuration for a terminal device to search for a downlink control channel from a signal transmitted by the apparatus, wherein the first search space configuration defines first starting positions and first durations for a first set of periodic search windows and the second search space configuration defines second starting positions and second durations for a second set of periodic search windows different from the first set of periodic search windows; determining a first set of periodic search spans formed by a first subset of time-domain symbols of each search window in the first set of periodic search windows and further determining a second set of periodic search spans formed by a second subset of time-domain symbols of each search window in the second set of periodic search windows; forming a sequence of search spans from the first set of periodic search spans and the second set of periodic search spans and determining a virtual search window changing in duration as dependent on a time interval between consecutive search spans in the sequence of search spans; determining, on the basis of a duration of the virtual search window, a maximum number of downlink control information candidates the terminal device is capable of processing within the virtual search window, wherein the maximum number of downlink control information candidates is configured to change together with the changing duration of the virtual search window; allocating downlink control information addressed to the terminal device to control channel elements of the virtual search window that are within the maximum number of downlink control channel candidates and amongst downlink control channel candidates processed by the terminal device within the virtual search window; and transmitting a signal comprising the downlink control information on the control channel elements of the virtual search window.

LIST OF DRAWINGS

Embodiments are described below, by way of example only, with reference to the accompanying drawings, in which FIG. 1 illustrates a wireless communication scenario to which some embodiments of the invention may be applied;

FIGS. 3 and 4 illustrate embodiments of a sequence of search spans of different search space configurations;

FIG. 5 illustrates an embodiment for mapping search space configurations between different numerologies;

FIG. 6 illustrates an embodiment of the process of FIG. 2;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
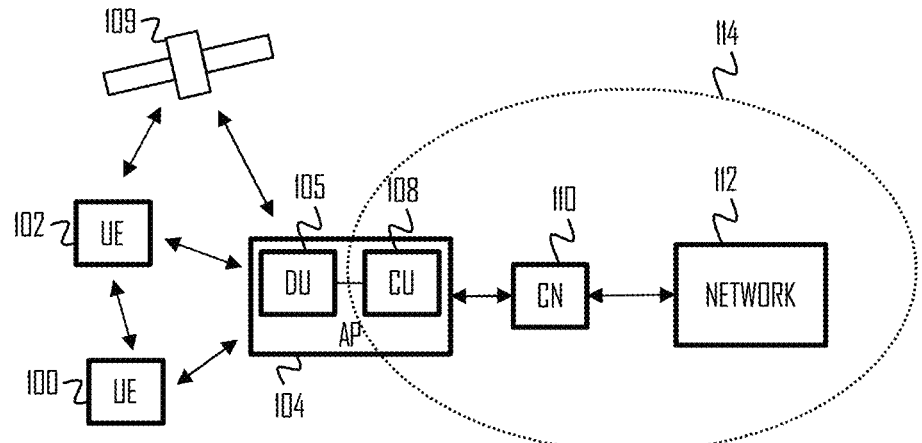

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g) NodeB) 104 providing the cell. (e/g) NodeB refers to an eNodeB or a gNodeB, as defined in 3GPP specifications. The physical link from a user device to a (e/g) NodeB is called uplink or reverse link and the physical link from the (e/g) NodeB to the user device is called downlink or forward link. It should be appreciated that (e/g)NodeBs or their functionalities may be implemented by using any node, host, server or access point etc. entity suitable for such a usage.

A communications system typically comprises more than one (e/g) NodeB in which case the (e/g)NodeBs may also be configured to communicate with one another over links, wired or wireless, designed for the purpose. These links may be used not only for signalling purposes but also for routing data from one (e/g) NodeB to another. The (e/g) NodeB is a computing device configured to control the radio resources of communication system it is coupled to. The NodeB may also be referred to as a base station, an access point, an access node, or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cm Wave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave-sub-THz). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Referring to the PDCCH detection discussed in Background, the number of downlink control channel candidates the terminal device needs to scan for the PDCCH and the downlink control information addressed to the terminal device is a function of several parameters: the number of time-frequency resource units to be scanned, the number of aggregation levels, a duration available for the scanning, etc. Furthermore, the 5G specifications enable configuring multiple parallel search space configurations to a terminal device. This naturally increases the number of downlink control channel candidates the terminal device needs to process. If the capabilities of the terminal device are exceeded, the terminal device may drop some PDCCH candidates. Unless controlled in some manner, the terminal device may thus drop a PDCCH candidate carrying DCI address to it. For that purpose, the terminal device may indicate its capabilities to the serving access node. Or alternatively, the gNB must otherwise have common understanding on the UE capabilities, e.g. based on the specification, or based on the specification and the related signalling. The capabilities may be indicated or expressed as a function of a number of symbols Y in a search span formed by a maximum number of consecutive symbols that may carry the PDCCH in a search window and, further, as a function of a time interval X between two consecutive spans. Both X and Y may be indicated in units of (OFDM) symbols and or in units of slots. The terminal device may indicate one or more combinations. The combination (X, Y) may be mapped to a maximum number of PDCCH candidates the terminal device is capable of processing per span. Because the time slot duration changes as a function of the numerology $\mu$, the capability also changes. Table 1 below illustrates some examples of capabilities of the terminal device. It should be highlighted that the capabilities may be different for different scenarios, e.g. different numbers of serving cells.

TABLE 1

| Numerology | Maximum number of PDCCH candidates per span | | |
|---|---|---|---|
| ($\mu$) | (2, 2) | (4, 3) | (7,3) |
| 0 | 14 | 28 | 44 |
| 1 | 12 | 24 | 36 |

As indicated in Table 1, the capabilities decrease as a function of the numerology. Further, when the terminal device is configured with multiple search space configurations, each having a specific slot periodicity as well as capability and positioning of the search spans defined by the combinations of (X, Y), the potentially overlapping search windows and resulting momentary overall PDCCH candidate processing capability of the terminal device becomes difficult to compute, which may result in uncontrolled dropping of some PDCCH candidates that may carry the DCI.

Figure 2:
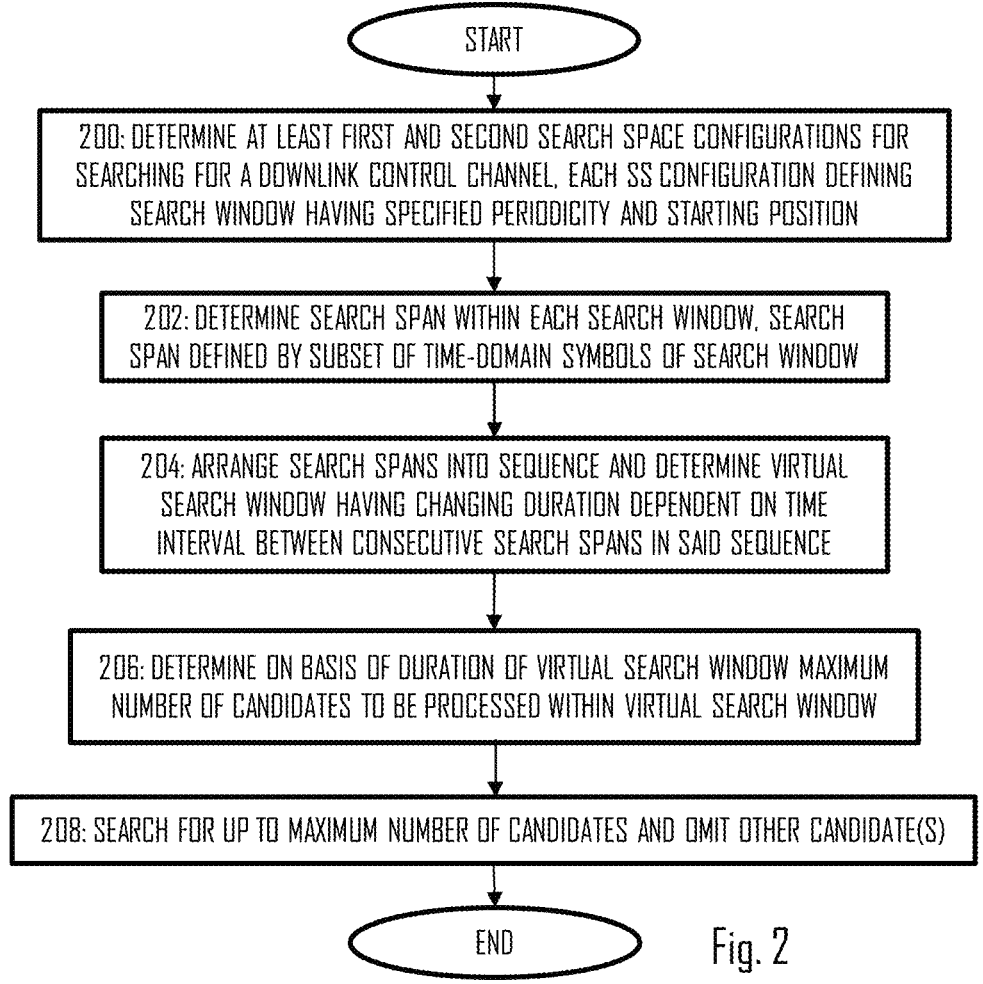
FIG. 2 illustrates an embodiment of a process for searching a received signal for a downlink control channel of a terminal device.

FIG. 2 illustrates a flow diagram of a process for the terminal device to search for a downlink control channel, e.g. the PDCCH. Referring to FIG. 2, the process comprises: determining (block 200) at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows; determining (block 202) a first set of periodic search spans formed by a first subset of time-domain symbols of each search window in the first set of periodic search windows and further determining a second set of periodic search spans formed by a second subset of time-domain symbols of each search window in the second set of periodic search windows; forming (block 204) a sequence of search spans from the first set of periodic search spans and the second set of periodic search spans and determining a virtual search window changing in duration as dependent on a time interval between consecutive search spans in the sequence of search spans; determining (block 206), on the basis of a duration of the virtual search window, a maximum number of downlink control information candidates the apparatus is capable of processing within the virtual search window, wherein the maximum number of downlink control information candidates is configured to change together with the changing duration of the virtual search window; and searching (block 208) the received signal within the virtual search window for up to the maximum number of downlink control channel candidates and omitting the searching for remaining downlink control channel candidates and, upon detecting the downlink control channel, extracting downlink control information on the downlink control channel.

By arranging the search spans of the multiple search space configurations in the sequential form, a temporal positioning of the search spans can be derived as well as time intervals between consecutive search spans. Some of consecutive search spans in the sequence may belong to the same search space configuration while other consecutive search spans in the sequence may belong to different search space configurations. The sequential arrangement enables the terminal device (and the access node) to determine how much time there is to process downlink control channel candidates of each span before the next span is received and, accordingly, the maximum number of downlink control channel candidates may be determined in a straightforward and predictable manner. This means also that the dropped downlink control channel candidates can be predicted beforehand. When the access node also uses this methodology, and a priority in the dropping as described below, the terminal device and the access node have a common understanding of which downlink control channel candidates the terminal device is capable of processing. Accordingly, the access node is able to allocate the downlink control information to one of those candidates.

A further advantage is support for multi-slot PDCCH searching where multiple search space configurations are applied concurrently.

Let us then describe some embodiments in greater detail with reference to a diagram of FIG. 3. FIG. 3 illustrates a time-slot structure (on top of FIG. 3) and search windows of the search space configurations therein. In FIG. 3, the search spans are illustrated with patterns: dotted pattern for search spans of the first search space configuration and lined pattern for search spans of the second search space configuration. As illustrated in FIG. 3, the first search space configuration may define the parameter X as four time slots, meaning that a time interval between first symbols of consecutive search spans of the first search space configuration is four time slots (or alternatively 4*14 OFDM symbols=48 OFDM symbols). As a result, periodic search windows of four time slots are acquired for the first search space configuration. A time slot may follow the meaning of a time slot in the system specifications for the 5G, LTE, or another system implementing the embodiments. The number of symbols per slot may depend on the numerology. The first search space configuration may further define the parameter Y as four symbols, meaning that the duration of the search span in units of (OFDM) symbols.

The second search space configuration may define X as six time slots and Y as two symbols, resulting in the periodic search window of six time slots, each search span therein formed by the two consecutive symbols.

In an embodiment, a starting position for each search space configuration may be defined as a parameter Xs, wherein a common reference for the starting position is used for all search space configurations. Such a reference may be a boundary of a radio frame, sub-frame, or half-frame, for example. Accordingly, the starting positions of the search space configurations may differ, as illustrated in FIG. 3 where the starting position of the second search space configuration is in a different time slot than the starting position of the first search space configuration. Parameter Xs of the first search space configuration may thus be zero time slots, while Xs of the second search space configuration is one time slot.

In an embodiment, the starting position of the search span is in the beginning of the search window. In another embodiment, the search span is located elsewhere than in the beginning of the search window. The location of the search span may be configured as a part of the respective search space configuration.

In an embodiment, a higher protocol layer defines the parameters X, Y, and Xs, and the searching is performed on a physical layer. The higher layer may be a radio resource control (RRC) layer.

In an embodiment, the virtual search window is defined as a time interval between (the beginning) of first symbols of consecutive search spans in the sequence of search spans. The sequence of periodic search spans thus comprises multiple virtual search windows that have different durations, dependent on the varying time intervals between the consecutive search spans in the sequence.

The lowest diagram in FIG. 3 illustrates the arrangement of the first and second search space configurations after block 204. Now that the search spans of the different search space configurations are arranged as a sequence, the virtual search windows can be formed. Because of the different characteristics of the different search space configurations, e.g. different periodicities and/or starting positions, search spans of the search space configurations may be arranged in various ways in the sequence. FIG. 3 thus illustrates merely one example. Referring to FIG. 3, the first virtual search window Xv is formed between the first symbol of the left-most (first) search span of the first search space configuration and the first symbol of the left-most (first) search span of the second search space configuration. The duration of the virtual search window is one time slot, as illustrated in FIG. 3. Since the periodicities X of the first and second search space configurations are four and six time slots, respectively, the next virtual search window is between the first symbols of the first search span of the second search space configuration and the second search span of the first search space configuration, resulting in a virtual search window having the duration of three time slots. The subsequent virtual search window is again three time slots, while the next virtual search window has the duration of the one time slot, as illustrated in FIG. 3. In this manner, the virtual search window with changing duration is formed by the sequence of the search spans of the search space configurations.

The term 'virtual search window' can be understood from the perspective that the virtual search window may be explicitly configured for none of the search space configurations in block 200 but, rather, it is formed when the search spans of the search space configurations are arranged in the sequential form. Therefore, the virtual search windows can be formed as a result of block 204. The virtual search windows can be formed whenever upon configuring the search space configurations. For example, an arbitrary number higher than one of future virtual search windows can be determined before a signal is received in the respective virtual search windows. This would be beneficial in particular for an access node arranging the downlink control information because then, the access node is able to determine the capabilities of the terminal device at any time in the future. The access node can thus avoid allocating the downlink control information into downlink control information candidates the terminal device is not capable of processing within the respective virtual search window.

As described above, the duration of the virtual search window specifies the maximum number of downlink control information candidates the apparatus performing the process of FIG. 2 is capable of processing within the virtual search window. Referring to FIG. 3, the maximum number of downlink control information candidates thus changes as a function of the changing duration of the virtual search window. The maximum number of downlink control information candidates may have one value for the virtual search window of one time slot, and another value for the virtual search window of three time slots.

FIG. 3 illustrates the search spans to which the access node may or may not allocate a monitoring occasion for PDCCH carrying the downlink control information addressed to the terminal device. The CORESET may form a subset of time-frequency resources of the search span, e.g.

it may cover only a subset of physical resource blocks (frequency resources) and/or a subset of time-domain symbols of the search span.

The downlink control channel candidates of comprised in a search space configuration may form a search space set the terminal device is configured to monitor for the downlink control information. The search space set may be defined as a set of PDCCH candidates for the terminal device to monitor. The CORESET is defined in terms of PDCCH search space sets (SS-sets). The search space set may include a common search space set defining downlink control channel candidates that are monitored by multiple terminal devices. The search space set may include a terminal-device-specific search space set defining downlink control channel candidates monitored only by the terminal device. Different radio network temporary identifiers (RNTIs) may be used for the different SS-sets, depending on the type and purpose of the SS-set. There is a variety of CSS types, each CSS type defined for signalling a specific part of the system information to the terminal devices in the cell. An SS-set further includes the monitoring occasions (slots or mini-slots), the number M of candidates for each aggregation level (AL) and an indication which downlink control information (DCI) formats to monitor. For example, M=(6, 6, 2, 2, 0) for AL (1, 2, 4, 8, 16) corresponds to the USS set specification of the first LTE release.

In an embodiment, the parameter Y is defined based on a maximum CORESET length. The value Y may equal to the maximum CORESET length.

In an embodiment, the maximum number of downlink control information candidates the apparatus is capable of processing within the virtual search window is further determined on the basis of a number of time-domain symbols within a search span, i.e. the parameter Y. In an embodiment, the search span is a current search span the apparatus is currently processing. Since the parameter Y changes for the different search spans in the sequence of the search spans, the maximum number of downlink control information candidates changes further as a function of the changing parameter Y. In another embodiment, the search span is the search span having the greatest number of time-domain symbols. Accordingly, parameter Y may remain static from the perspective of its effect on the maximum number of downlink control information candidates, and the maximum number of downlink control information candidates changes only as the function of the duration of the virtual search window.

In an embodiment, the maximum number of downlink control information candidates the apparatus is capable of processing within the virtual search window is defined in terms of a maximum number of blind decoding (BD) attempts the apparatus is capable of performing within the virtual search window and the number of non-overlapping control channel elements (CCE) the apparatus is capable of demodulating within the virtual search window. In the literature, a commonly used term is BD/CCE capability or a BD/CCE limit of the terminal device. When the BD/CCE limit is reached, the terminal device drops or omits processing of further downlink control channel candidates. The terminal device may follow certain, pre-defined dropping rules with respect to the downlink control channel candidates that are dropped. Below, some embodiments are described. Tables 2 and 3 below illustrate some exemplary values of the BD/CCE capabilities of the terminal device for different parameter combinations (X, Y). Table 2 illustrates the BD capability in terms of a maximum number of blind detection attempts per serving cell, while Table 3 illustrates the maximum number of non-overlapped control channel elements per search span and per serving cell. The parameter Y may have an arbitrary value because in some embodiments described above the duration of the search span does not affect the capability. This results in that the duration of the virtual search window has a greater effect on the capabilities. Separate tables may be defined for different carrier aggregation scenarios involving multiple cells. Another approach is to determine the BD/CCE capabilities for different multi-cell scenarios based on the single-cell capabilities. An example of such is to multiply the single cell BD/CCE capabilities by the number of cells. The overall BD/CCE capabilities may be determined in other ways, and an important factor would be that the BD/CCE capabilities represent the real processing capabilities of the terminal device.

TABLE 2

| Numerology | Maximum number of blind decoding attempts (PDCCH candidates) per search span | | | |
|---|---|---|---|---|
| ($\mu$) | (14, Y) | (28, Y) | (56, Y) | (112, Y) |
| 3 | 20 | N/A | N/A | N/A |
| 5 | 5 | 10 | 20 | N/A |
| 6 | 5 | 5 | 10 | 20 |

TABLE 3

| Numerology | Maximum number of aggregated non-overlapped control channel elements per search span | | | |
|---|---|---|---|---|
| ($\mu$) | (14, Y) | (28, Y) | (56, Y) | (112, Y) |
| 3 | 32 | N/A | N/A | N/A |
| 5 | 8 | 16 | 32 | N/A |
| 6 | 8 | 8 | 16 | 32 |

In some cases, the access node may configure downlink control channel candidates that are outside the search spans described above. The terminal device may omit processing of such downlink control channel candidates that are outside the search spans of the configured search space configurations. In other words, the terminal device may count, as valid downlink control channel candidates, only those downlink control channel candidates that are fully within the search space spans of the configured search space configurations.

It should be appreciated that while the present description describes the embodiments mainly in the context of the first and second search space configurations, the number of configured search space configurations may be higher than two. Search spans of the three or more search space configurations may be arranged in the sequential form by following the principles described herein in a straightforward manner. Some search space configurations may have the same parameters (X, Y), i.e. have the same periodicity and the duration of the search spans, while one or more other search space configurations may have different parameters (X, Y).

Depending on the number of configured search space configurations and their parameters (X, Xs, Y) defining the locations of the respective search spans, the search spans may overlap. FIG. 4 illustrates such a scenario in an embodiment where {X=4, Xs=0, Y=4} for the first search space configuration, and {X=6, Xs=2, and Y=2} for the second search space configuration. Obviously, this results in a different sequence of search spans than in FIG. 3 and different dynamics for the virtual window duration and the associated maximum number of downlink control channel candidates the terminal device is capable of processing. Furthermore, the search spans of the search space configurations overlap occasionally, as highlighted in FIG. 4. In such a case, the greatest value of the parameter Y amongst the overlapping search spans may be followed. As illustrated in FIG. 4, the resulting search span would have the duration of four symbols (Y=4) which is the greatest Y={2, 4} among the search space configurations. In embodiments where the dropping of the downlink control channel candidates is dependent on the parameter Y, the selection of Y thus affects the maximum number of downlink control channel candidates for the overlapping search spans.

In some cases, the consecutive search spans of the different search space configurations may be directly next to one another in the sequence. In such a case, the two search spans may be handled as one larger search span having the parameter value Y as a sum of the parameter values Y of the two search spans. In such a case, the duration of the virtual search window does not become zero, thanks to combining the search spans into one. Similar combining may be performed when the two search spans are partially overlapping.

As described above, the terminal device may indicate its capabilities to the serving access node in the form of a combination of parameters (X, Y). The terminal device may indicate only certain combinations of the parameter (X, Y), e.g. (1, 2), (2, 2), (4, 2), (4, 3), (4, 4), and (7, 3). As result of block 204, the sequence of virtual search windows may include some durations of the virtual search windows that are not within these indicated capabilities, e.g. the virtual search window duration 3. Upon determining that a maximum number of downlink control information candidates the apparatus is capable of processing has not been specified for at least one of the virtual search windows, a maximum number of downlink control information candidates the apparatus is capable of processing that is associated with a search window having a duration smaller than the duration of the at least one virtual search window may be selected. Referring to FIG. 3, for the virtual window Xv=3 time slots, the capabilities in terms of the maximum number of downlink control channel candidates may be selected on the basis of the parameter X=2, because that is the greatest value below 3 for which the capabilities have been indicated. Accordingly, the maximum number of downlink control channel candidates mapped to (2, 2) may be selected. If the duration of the virtual search window would be five time slots (not shown in the illustrated examples), the maximum number of downlink control channel candidates may be selected amongst (4, 2), (4, 3), (4, 4), e.g. on the basis of the parameter Y of the virtual search window.

As described above, the terminal device may be configured to perform the PDCCH searching with different numerologies. For example, the first search space configuration may be based on a first sub-carrier spacing (first numerology) while the second search space configuration is based on a second sub-carrier spacing (second numerology) greater than the first sub-carrier spacing. wherein the first subset of time-domain symbols has a smaller number of time-domain symbols than the second subset of time-domain symbols. For example, certain search spaces such as the common search spaces may be operated by using the first sub-carrier spacing (e.g. 120 kHz) while the user-specific search spaces may operate according to the second sub-carrier spacing (e.g. 480 kHz or 960 kHz). From the perspective of signalling overhead, it would be beneficial to provide a mechanism where the parameters X and Y need not to be signalled separately for each numerology. For that purpose, one of the numerologies may serve as an anchor numerology, and the capabilities of the terminal device (in terms of the different parameter (X, Y) combinations) are signalled on the anchor numerology. Both the terminal device and the access node may then employ a common mapping scheme that maps the parameters X, Y, Xs to the other numerologies. FIG. 5 illustrates an embodiment of the mapping between the two search space configurations operating different numerologies.

As illustrated in FIG. 5, the lower numerology has longer time slots with longer symbol durations. The number of symbols per time slot may be the same for the different numerologies, although in some embodiments the number of symbols per time slot may differ between the numerologies. Let us assume that the search spans are defined for the search space configurations according to the anchor numerology, e.g. the first numerology. The search span may be defined to have the duration of two symbols (Y=2) and the periodicity of four time slots (X=4). This is illustrated in FIG. 5 with the search span represented by the dotted filling. The mapping may then map Y=2 to Y=3 on the second numerology, as illustrated in FIG. 5 by the search span represented by the vertical lining. The periodicity defined by the parameter X may remain the same between the numerologies, or it may also change according to the mapping. For example, the periodicity may be greater for greater numerologies.

Furthermore, the mapping between the parameter X and the maximum number of downlink control channel candidates the apparatus is capable of processing may vary between the numerologies, according to the mapping. For example, X=4 or (X, Y)=(4, 3) may be associated with a first value of the maximum number of downlink control channel candidates on the first numerology and with a different value of the maximum number of downlink control channel candidates on the second numerology. Depending on the other mappings, in particular how the periodicity defined by the parameter X is mapped between the numerologies, the mapping between the values of the maximum number of downlink control channel candidates on the different numerologies may also vary. When the terminal device and the access node both use the same mapping, they both have the same understanding of the maximum number of downlink control channel candidates the terminal device is capable of processing. Additionally, when they both share the same understanding of the priority of the downlink control channel candidates, they both know how many and which of the control channel candidates the terminal device is capable of scanning. The prioritization aspect is discussed in connection with the embodiment of FIG. 6.

FIG. 6 illustrates a flow diagram of an embodiment of the process of FIG. 2. The process may be performed by the apparatus for the terminal device. Referring to FIG. 6, the apparatus may receive the search space configurations from the serving access node, e.g. in the form of radio resource control (RRC) signalling. As described above, each search space configuration may define a duration/periodicity of the search windows (parameter X), the starting position of the search windows with respect to the reference location (parameter Xs), and the duration of the search spans within the search windows (parameter Y). Upon receiving the search space configurations, the apparatus may perform the blocks 200 to 204 of FIG. 2. Furthermore, the apparatus may determine the parameter Xv for each virtual search window and, optionally, map the parameter Xv to the greatest value of X≤Xv amongst the capabilities indicated to the access node. Accordingly, the apparatus may determine for each virtual search window the capability beforehand. Then, the apparatus may start searching for the PDCCH carrying the downlink control information addressed to the terminal device amongst the downlink control channel candidates.

In block 602, at the start of a virtual search window, the apparatus may determine the maximum number of control channel candidates to search from a signal received in the virtual search window. As a result, the terminal device may determine the number of blind detection attempts (BD) and the maximum number of non-overlapping control channel elements to combine (the number of aggregation levels) in the search for the PDCCH carrying the downlink control information for the terminal device. In blocks 604 and 606, the apparatus then determines the downlink control channel candidates and searches for the PDCCH carrying the downlink control information addressed to the terminal device amongst those candidates. The processing may be carried out in a prioritized order of the downlink control channel candidates. As a consequence, at least some low-priority candidates will be omitted from the search. In block 608, it is determined whether or not to proceed to the next virtual search window. If no downlink control information has been found amongst the candidates, the process may return to block 602. Upon detecting the downlink control information addressed to the terminal device in a downlink control channel candidate, the process may end immediately, and the apparatus may continue with the extraction of the downlink control information comprising, for example, scheduling information.

In an embodiment, the prioritization in block 604 may comprise prioritizing, amongst the configured search space configurations, downlink control channel candidates of one numerology over downlink control channel candidates of another numerology. Accordingly, the apparatus may in block 606 search all downlink control channel candidates of the first search space configuration supporting the lower numerology and omit the searching for downlink control channel candidates from at least some downlink control channel candidates of the second search space configuration supporting the higher numerology.

In another embodiment, the prioritization in block 604 may comprise prioritizing, amongst the configured search space configurations, downlink control channel candidates of the common search spaces over the user-specific search spaces. Accordingly, the apparatus may in block 606 search all downlink control channel candidates of the common search spaces and omit the searching for at least some downlink control channel candidates of the user-specific search spaces.

Figure 7:
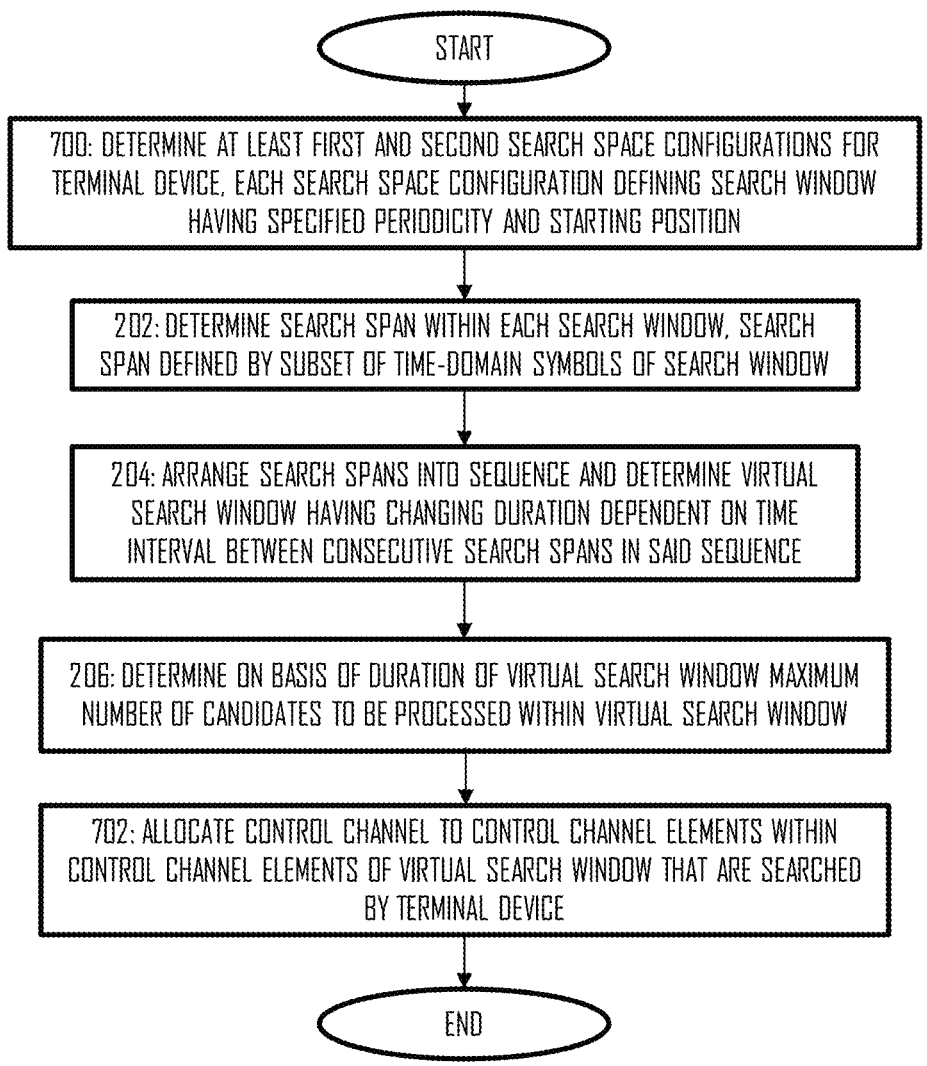
FIG. 7 illustrates a process for allocating downlink control information addressed to a terminal device.

As described above, the access node may also be aware of the capabilities of the terminal device and the valid search space configurations of the terminal device. As a consequence, the access node may use the corresponding information to determine the downlink control channel candidates the terminal device is capable of processing and, as a consequence, allocate the downlink control information amongst those downlink control channel candidates. FIG. 7 illustrates a process performed by an apparatus for the access node. Referring to FIG. 7, the process comprises: determining (block 700) at least a first search space configuration and a second search space configuration for a terminal device to search for a downlink control channel from a signal transmitted by the apparatus, wherein the first search space configuration defines first starting positions and first durations for a first set of periodic search windows and the second search space configuration defines second starting positions and second durations for a second set of periodic search windows different from the first set of periodic search windows; determining (block 202) a first set of periodic search spans formed by a first subset of time-domain symbols of each search window in the first set of periodic search windows and further determining a second set of periodic search spans formed by a second subset of time-domain symbols of each search window in the second set of periodic search windows; forming (block 204) a sequence of search spans from the first set of periodic search spans and the second set of periodic search spans and determining a virtual search window changing in duration as dependent on a time interval between consecutive search spans in the sequence of search spans; determining (block 206), on the basis of a duration of the virtual search window, a maximum number of downlink control information candidates the apparatus is capable of processing within the virtual search window, wherein the maximum number of downlink control information candidates is configured to change together with the changing duration of the virtual search window; allocating (block 702) downlink control information addressed to the terminal device to control channel elements of the virtual search window that are within the maximum number of downlink control channel candidates and amongst downlink control channel candidates processed by the terminal device within the virtual search window; and transmitting a signal comprising the downlink control information on the control channel elements of the virtual search window.

As described above, both the terminal device and the access node have the information on the search space configurations of the terminal device and carry out blocks 202 to 206 on the basis of the same information. Accordingly, they both have the knowledge of the capabilities of the terminal device to search the control channel candidates and, as a consequence, the access node is able to allocate the downlink control information amongst the searched candidates. This is by the virtue of the sequence of virtual search windows is built in the same manner in the terminal device and the access node, bringing out the true capabilities of the terminal device when multiple search space configurations have been configured.

Additionally, with the shared knowledge about the prioritization of the downlink control channel candidates, the access node is aware of the candidates the terminal device is able to search and the candidates the terminal device will drop from the search. This further reduces the probability of the terminal device to miss downlink control channel addressed to it.

Figure 8:
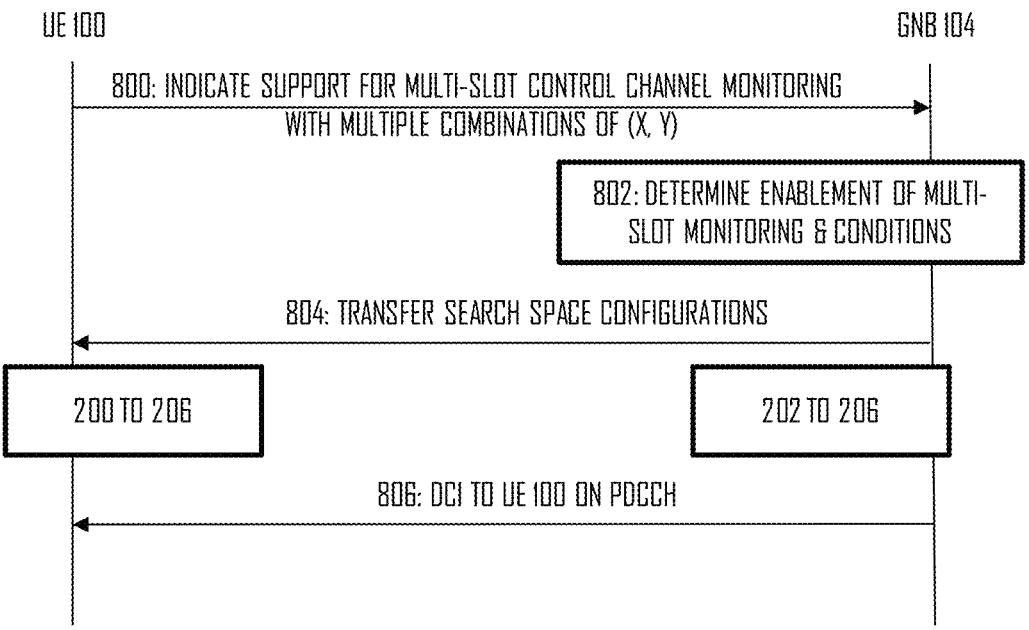
FIG. 8 illustrates a signalling diagram of an embodiment for configuring search space configurations for a terminal device.

FIG. 8 illustrates a signalling diagram of configuring the search space configurations. The configuration may be carried out via the RRC signalling. Referring to FIG. 8, the terminal device may indicate in step 800 to the access node its support for the multiple concurrent search space configurations (multi-slot monitoring) and, additionally, indicate the supported parameter combinations (X, Y), e.g. the capabilities of the terminal device in terms of the BD/CCE limits. In another embodiment, the access node obtains the information on the supported search space configurations and the capabilities of the terminal device by other means, e.g. based on the system specifications or based on other capability information. Upon receiving an RRC message comprising the indication in step 800 or upon determining the information, the access node may determine the search space configurations for the terminal device, e.g. on the basis of the indicated capabilities of the terminal device. This may be carried out according to the system specifications for the 5G, for example. Upon determining the search space configurations, the access node may transfer in step 804 one or more (RRC) control messages indicating the search space configurations to the terminal device. Each search space configuration may include a unique combination of the search window (X) and the search span (Y), and their locations (Xs) within a sub-frame structure. Upon receiving the search space configurations in step 804, the terminal device may perform the blocks 200 to 206 and start monitoring the PDCCH candidates for the downlink control information addressed to the terminal device. Similarly, the access node may, upon determining to transmit downlink control information to the terminal device, carry out blocks 202 to 206 to determine a combination of control channel elements forming a downlink control channel candidate the terminal device will search. Upon finding such a combination of the control channel elements, the access node may add the downlink control information to the control channel elements and transmit the downlink control channel to the terminal device in step 806, and the terminal device is capable of detecting the downlink control information in block 208.

Figure 9:
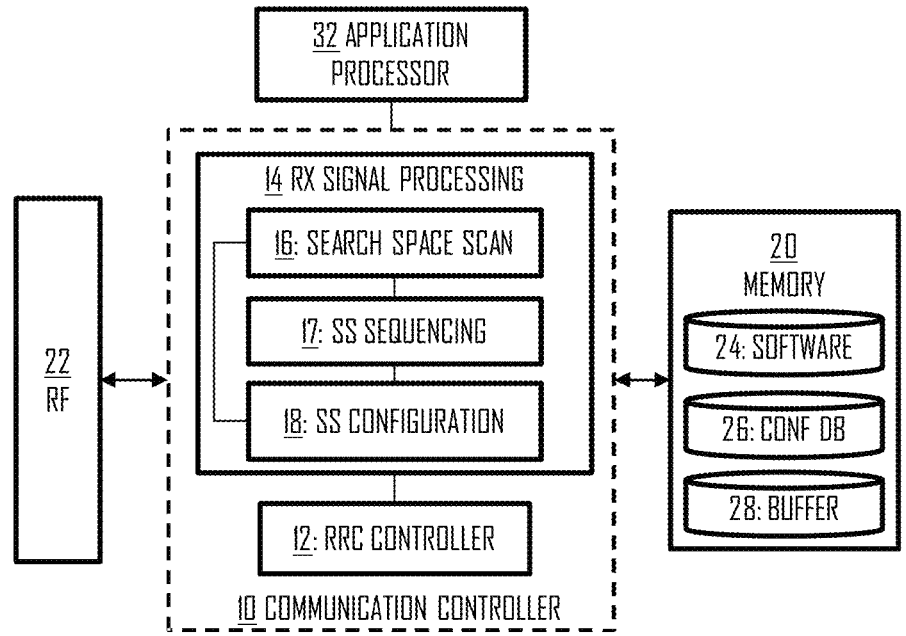
FIGS. 9 and 10 illustrate block diagrams of structures of apparatuses according to some embodiments.

FIG. 9 illustrates an apparatus comprising means for carrying out the process of FIG. 2 or any one of the embodiments described above. The apparatus may comprise a processing circuitry, such as at least one processor, and at least one memory 20 including a computer program code (software) 24, wherein the at least one memory and the computer program code (software) are configured, with the at least one processor, to cause the apparatus to carry out the process of FIG. 2 or any one of its embodiments described above. The apparatus may be for the terminal device 100. The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device. The at least one processor or a processing circuitry may realize a communication controller 10 controlling communications in a radio interface of the cellular communication system in the above-described manner. The communication controller may be configured to establish and manage radio connections, transfer of data over the radio (RRC) connections and transmit the reference symbol sequences generated according to any one of the embodiments described herein.

The communication controller 10 may comprise a radio resource control (RRC) controller 12 configured to establish, manage, and terminate radio connections between the access node(s) of the cellular communication system and the terminal device. The RRC controller 12 may be configured, for example, to establish and reconfigure the RRC connections in the terminal device. The RRC controller may carry out steps 800 and 804 of FIG. 8 performed in the terminal device, for example, to configure the search space configurations.

The communication controller 10 may comprise a receiver signal processing circuitry 14 configured to perform the process of FIG. 2. The circuitry 14 may comprise a search space (SS) configuration circuitry 12 configured to carry out blocks 200 and 202. A search space sequencing circuitry 17 may then concatenate the search spans of the different search space configurations, as described above in connection with block 204 and, optionally, determine the maximum number of control channel candidates to search. A search space scanning circuitry 16 may then scan the subset of the control channel candidates (up to the maximum number) of a signal received in the current virtual window and search for the downlink control information addressed to the apparatus. Upon detecting the downlink control information, the circuitry 16 may output the downlink control information for further processing in the apparatus.

The apparatus may further comprise an application processor 32 executing one or more computer program applications that generate a need to transmit and/or receive data through the communication controller 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network and cause the need for executing the process of FIG. 2.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the search space configurations, the capabilities of the terminal device and the prioritization of the downlink control channel candidates. The memory 20 may further store a buffer 28 for storing the signal(s) received within the virtual search window(s).

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

Figure 10:
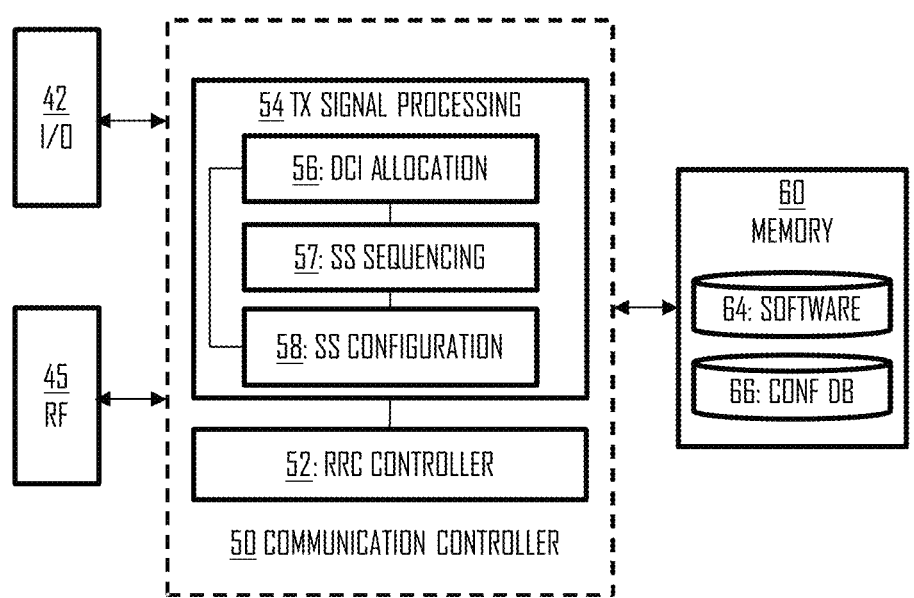

FIG. 10 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out functions of the access node 104 in the process of FIG. 7 or any one of its embodiments described above. The apparatus may be for the access node. The apparatus may be a circuitry or an electronic device realizing some of the above-described embodiments in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 50 controlling communications in the above-described manner. The communication controller may be configured to establish and manage radio connections and transfer of data over the radio connections.

The communication controller 50 may comprise an RRC controller 52 configured to establish, manage, and terminate radio connections with terminal devices served by the access node. The RRC controller 52 may be configured, for example, to establish and reconfigure the RRC connections with the terminal devices. The RRC controller may carry out steps 800 to 804 of FIG. 8, for example, to enable and configure the search space configurations for the terminal device. The communication controller may further comprise a scheduler (not shown) configured to schedule downlink/uplink transmission resources to the terminal devices and to add information on the scheduled resources into downlink control information addressed to the terminal device and transferred on the PDCCH of the terminal device.

The communication controller 50 may further comprise a transmission signal processing circuitry 54 configured to generate and transmit signals over the radio interface to the terminal device. The circuitry 54 may comprise a search space (SS) configuration circuitry 52 configured to carry out block 202 in the access node. A search space sequencing circuitry 57 may then concatenate the search spans of the different search space configurations of the terminal device, as described above in connection with block 204 and, optionally, determine the maximum number of control channel candidates to search. A downlink control information (DCI) allocation circuitry 16 may then determine a combination of control channel elements the terminal device is able to process within the virtual search window in which the access node is about to transmit the downlink control information and allocate the downlink control information on those control channel elements. Thereafter, the downlink control information on the control channel elements may be transmitted to the terminal device over the radio interface.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the search space configurations for terminal devices served by the access node, the capabilities of the terminal devices and their prioritization of the downlink control channel candidates.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 45 may comprise hardware and software needed for realizing the radio communications over the radio interface, e.g. according to specifications of an LTE or 5G radio interface.

The apparatus may further comprise another communication interface 42 for communicating towards the core network. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 3, 7, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one processor and at least one memory including a computer program code, the at least one memory and computer program code configured to, with the at least one processor, cause the apparatus to:
   determine at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows;
   determine a first set of periodic search spans formed by a first subset of time-domain symbols of each search window in the first set of periodic search windows and further determining a second set of periodic search spans formed by a second subset of time-domain symbols of each search window in the second set of periodic search windows;

form a sequence of search spans from the first set of periodic search spans and the second set of periodic search spans and determining a virtual search window changing in duration as dependent on a time interval between consecutive search spans in the sequence of search spans;

determine, on the basis of a duration of the virtual search window, a maximum number of downlink control information candidates the apparatus is capable of processing within the virtual search window, wherein the maximum number of downlink control information candidates is configured to change together with the change duration of the virtual search window;

search the received signal within the virtual search window for up to the maximum number of downlink control channel candidates omitting the searching for remaining downlink control channel candidates; and upon detecting the downlink control channel, extract downlink control information on the downlink control channel.

2. The apparatus of claim 1, wherein the determining the maximum number of downlink control information candidates further comprises causing the apparatus to determine the maximum number of downlink control information candidates on the basis of a number of time-domain symbols within a search span.

3. The apparatus of claim 1, wherein the determining the maximum number of downlink control information candidates further comprises causing the apparatus to determine the maximum number of downlink control information candidates on the basis of a number of time-domain symbols within a search span, wherein the search span is a current search span the apparatus is currently processing.

4. The apparatus of claim 1, wherein the determining the maximum number of downlink control information candidates further comprises causing the apparatus to determine the maximum number of downlink control information candidates on the basis of a number of time-domain symbols within a search span, wherein the search span is the search span having the greatest number of time-domain symbols.

5. The apparatus of claim 1, wherein the determining the maximum number of downlink control information candidates further comprises causing the apparatus to determine the maximum number of downlink control information candidates on the basis of a number of time-domain symbols within a search span, wherein the search span comprises a plurality of consecutive orthogonal frequency-division multiplexing symbols of a currently processed control resource set.

6. The apparatus of claim 1, wherein the determining the maximum number of downlink control information candidates further comprises causing the apparatus to determine the maximum number of downlink control information candidates on the basis of a number of time-domain symbols within a search span, wherein the apparatus is further caused to receive the number of symbols in the search span from a higher protocol layer.

7. The apparatus of claim 1, wherein the maximum number of downlink control information candidates the apparatus is capable of processing within the virtual search window is defined in terms of a maximum number of blind decoding attempts the apparatus is capable of performing within the virtual search window and the number of non-overlapping control channel elements the apparatus is capable of demodulating within the virtual search window.

8. The apparatus of claim 1, wherein the maximum number of downlink control information candidates the apparatus is capable of processing within the virtual search window is different for consecutive virtual search windows having different lengths.

9. The apparatus of claim 1, wherein the first search space configuration is based on a first sub-carrier spacing while the second search space configuration is based on a second sub-carrier spacing greater than the first sub-carrier spacing, wherein the first subset of time-domain symbols has a smaller number of time-domain symbols than the second subset of time-domain symbols.

10. The apparatus of claim 1, wherein the maximum number of downlink control information candidates the apparatus is capable of processing within the virtual search window is different for consecutive virtual search windows having different lengths, and wherein the apparatus is further caused to search all downlink control channel candidates of the first search space configuration and to omit the searching for downlink control channel candidates from at least some downlink control channel candidates of the second search space configuration.

11. The apparatus of claim 1, wherein the apparatus is further configured to omit the searching for at least one control channel candidate that is outside the search spans.

12. An apparatus comprising at least one processor and at least one memory including a computer program code, the at least one memory and computer program code configured to, with the at least one processor, cause the apparatus to:

determine at least a first search space configuration and a second search space configuration for a terminal device to search for a downlink control channel from a signal transmitted by the apparatus, wherein the first search space configuration defines first starting positions and first durations for a first set of periodic search windows and the second search space configuration defines second starting positions and second durations for a second set of periodic search windows different from the first set of periodic search windows;

determine a first set of periodic search spans formed by a first subset of time-domain symbols of each search window in the first set of periodic search windows and further determine a second set of periodic search spans formed by a second subset of time-domain symbols of each search window in the second set of periodic search windows;

form a sequence of search spans from the first set of periodic search spans and the second set of periodic search spans and determining a virtual search window changing in duration as dependent on a time interval between consecutive search spans in the sequence of search spans;

determine, on the basis of a duration of the virtual search window, a maximum number of downlink control information candidates the terminal device is capable of processing within the virtual search window, wherein the maximum number of downlink control information candidates is configured to change together with the changing duration of the virtual search window;

allocate downlink control information addressed to the terminal device to control channel elements of the virtual search window that are within the maximum number of downlink control channel candidates and amongst downlink control channel candidates processed by the terminal device within the virtual search window; and transmit a signal comprising the downlink control information on the control channel elements of the virtual search window.

13. A method comprising:
determining, by a terminal device, at least a first search space configuration and a second search space configuration for searching for a downlink control channel from a received signal, wherein the first search space configuration defines first starting positions and first durations for a first set of periodic search windows and the second search space configuration defines second starting positions and second durations for a second set of periodic search windows different from the first set of periodic search windows;
determining, by the terminal device, a first set of periodic search spans formed by a first subset of time-domain symbols of each search window in the first set of periodic search windows and further determining a second set of periodic search spans formed by a second subset of time-domain symbols of each search window in the second set of periodic search windows;
forming, by the terminal device, a sequence of search spans from the first set of periodic search spans and the second set of periodic search spans and determining a virtual search window changing in duration as dependent on a time interval between consecutive search spans in the sequence of search spans;
determining, by the terminal device on the basis of a duration of the virtual search window, a maximum number of downlink control information candidates the apparatus terminal device is capable of processing within the virtual search window, wherein the maximum number of downlink control information candidates is configured to change together with the changing duration of the virtual search window; and
searching, by the terminal device, the received signal within the virtual search window for up to the maximum number of downlink control channel candidates and omitting the searching for remaining downlink control channel candidates and, upon detecting the downlink control channel, extracting downlink control information on the downlink control channel.

14. The method of claim 13, wherein the determining the maximum number of downlink control information candidates further comprises determining the maximum number of downlink control information candidates on the basis of a number of time-domain symbols within a search span.

15. The method of claim 13, wherein the determining the maximum number of downlink control information candidates further comprises determining the maximum number of downlink control information candidates on the basis of a number of time-domain symbols within a search span, wherein the search span is a current search span the apparatus is currently processing.

16. The method of claim 13, wherein the determining the maximum number of downlink control information candidates further comprises determining the maximum number of downlink control information candidates on the basis of a number of time-domain symbols within a search span, wherein the search span is the search span having the greatest number of time-domain symbols.

17. The method of claim 13, wherein the determining the maximum number of downlink control information candidates further comprises determining the maximum number of downlink control information candidates on the basis of a number of time-domain symbols within a search span, wherein the search span comprises a plurality of consecutive orthogonal frequency-division multiplexing symbols of a currently processed control resource set.

18. The method of claim 13, wherein the determining the maximum number of downlink control information candidates further comprises determining the maximum number of downlink control information candidates on the basis of a number of time-domain symbols within a search span, and further comprising receiving the number of symbols in the search span from a higher protocol layer.

19. The method of claim 13, wherein the maximum number of downlink control information candidates the apparatus is capable of processing within the virtual search window is defined in terms of a maximum number of blind decoding attempts the apparatus is capable of performing within the virtual search window and the number of non-overlapping control channel elements the terminal device is capable of demodulating within the virtual search window.

20. The method of claim 13, wherein the maximum number of downlink control information candidates the terminal device is capable of processing within the virtual search window is different for consecutive virtual search windows having different lengths.

* * * * *